United States Patent [19]

Waitkus

[11] 4,379,913
[45] Apr. 12, 1983

[54] COMPOSITIONS USEFUL AS INTERNAL ANTISTATIC ADDITIVES FOR POLYMERIC STRUCTURES

[75] Inventor: Calvin J. Waitkus, Bridgewater, N.J.

[73] Assignee: Diamond Shamrock Corporation, Dallas, Tex.

[21] Appl. No.: 374,670

[22] Filed: May 4, 1982

[51] Int. Cl.³ ............................................. C08G 63/66
[52] U.S. Cl. .................................... 528/300; 524/366; 524/910; 524/911; 525/419; 525/437; 528/272; 528/301; 528/310; 560/14; 560/89; 568/609
[58] Field of Search ....................... 524/366, 910, 911; 528/272, 300, 301, 310; 525/437, 419; 560/14, 89; 568/609

[56] References Cited

U.S. PATENT DOCUMENTS

| | | | |
|---|---|---|---|
| 3,655,821 | 4/1972 | Lofquist et al. | 524/910 |
| 3,666,731 | 5/1972 | Crovatt et al. | 260/78 S |
| 3,882,190 | 5/1975 | Wells | 524/910 |
| 4,069,277 | 1/1978 | Mathis et al. | 524/910 |
| 4,093,676 | 6/1978 | Weipert et al. | 524/910 |
| 4,108,922 | 8/1978 | Crescentini et al. | 260/830 P |

Primary Examiner—Lucille M. Phynes
Attorney, Agent, or Firm—Leslie G. Nunn, Jr.

[57] ABSTRACT

Chain extended random alkoxylated polyols having branched configurations are useful as internal antistatic additives for polymeric structures. A polyol having a branched configuration is alkoxylated with a mixture of ethylene oxide and propylene oxide and then chain extended to produce a high viscosity fluid additive which is compatible as a dispersed phase with polymer melts and does not agglomerate or separate from the melt during spinning. From about 0.1% to about 15% by weight of the additive is incorporated in polymeric structures as an antistatic agent. A useful additive composition is obtained using pentaerythritol tetrapropoxylate as the polyol and Bisphenol A diglycidyl ether as the difunctional reactant.

12 Claims, No Drawings

COMPOSITIONS USEFUL AS INTERNAL ANTISTATIC ADDITIVES FOR POLYMERIC STRUCTURES

BACKGROUND OF THE INVENTION

1. Field of the Invention

This invention relates to an improved antistatic agent, its preparation and use in polymeric shapes such as fibers and films.

2. Description of the Prior Art

Synthetic polymers when formed into such articles as molded objects or films are known to have a marked tendency to generate and accumulate electrostatic charges. When charged, these articles tend to accumulate concentrations of dirt and soil, which are unsightly in appearance and interfere with the end uses of the objects. When polymers are formed into fibers such as nylon and polyester the electrostatic charges create processing problems in fiber and yarn production such as poor package formation, filament and yarn breaks, and uneven spun yarn formation. In consumer use, carpeting made from synthetic fibers has a tendency to generate annoying shocks in cold, dry weather; while in apparel, the charged fabric clings uncomfortably to the wearer, shocks while the garment is being removed, and has an increased tendency to attract lint and soil.

In fiber production, topical antistats are used to decrease or eliminate the charges; such treatments have proven to be of little use in consumer applications because of their lack of permanency. Other methods used to decrease electrostatic charging in consumer applications of fibers include copolymerization of monomers containing ionizable radicals, surface grafted polymerization of monomers conferring antistatic properties to fibers, inclusion of metallic fibers in spun yarns, inclusion of carbon or metallic coated yarns or carbon-coated filaments within a bundle of continuous filaments, and incorporation of an antistatic additive in the matrix polymer used to melt spin fibers such as nylon and polyester. Incorporation of an additive into the polymer structure has proven to be a useful and flexible means of achieving antistatic effects.

It is taught in U.S. Pat. No. 3,329,557—Magat and Tanner, to use polyalkylene ethers of high molecular weight as a dispersed phase within the polymeric structure to improve the electrostatic properties of synthetic filaments. It is disclosed more specifically in U.S. Pat. No. 3,475,898 to Magat and Sharkey to use polyethylene-propylene ether glycols for the same purpose. Crovatt, Jr. in U.S. Pat. No. 3,388,104 discloses the use of the ethoxylated triglyceride of hydroxy stearic acid as an internal additive to polyamide fibers to modify their electrostatic propensity. In U.S. Pat. No. 3,366,731—Crovatt, Jr., discloses static resistant polyamide fibers containing the ethoxylated triglyceride of hydroxy stearic acid chain extended. In U.S. Pat. No. 3,860,671—Kowallik et al, disclose antistatic polyamide fibers containing a polyalkylene oxide reaction product. In U.S. Pat. No. 4,032,595—Fischer et al, disclose antistatic agents that are the reaction product of a polyalkoxylated triglyceride, of similar structure to that used by Crovatt, Jr., with an ester of oxalic or malonic acid. In U.S. Pat. No. 4,165,303, Schlossman et al, teach antistatic agents that are the mixed esters of polybasic acids and polyoxyalkylene glycols. In U.S. Pat. No. 3,755,497—Weedon et al, teach the use of propylene oxide-ethylene oxide copolymers based on ethylene diamine as antistatic agents when used in fibers of polyamide, polyester, polyurea, polyurethane or polysulfonamide; and in U.S. Pat. No. 4,108,922—Crescentini et al, disclose the use of Weedon's structure chain extended as an internal antistatic agent for polyamide fibers.

There are a number of disadvantages in use inherent in the prior art. For example, polyethylene glycols of sufficiently high molecular weight to be antistatic in effect when included inside the fiber are waxes with low melt viscosities which lead to difficulties in melt blending of the structure with molten polymer, which tend to allow agglomeration of the dispersed product phase in the molten polymer and separation of the dispersion from the polymer, thereby causing spinning drips. For improved performance they may require the use of thickening agents to increase their melt viscosities. Effective antistatic agents when dispersed in the fiber form rod-like particles after drawing of the fiber and in the case of low viscosity additives these rod-like particles tend to vary widely in diameter and length, thereby being less effective in antistatic action. Waxy, rod-like particles are known to break under normal conditions of drawing, and under flexing of fibers in their use in textile fabrics, thereby decreasing the effective length of the rods and concomitantly decreasing their effectiveness in anti-electrostatic activity.

In use of ethoxylated hydrogenated castor oils similar difficulties exist, it being a hard brittle wax of low melt viscosity at degrees of ethoxylation effective in obtaining antistatic properties. Chain extension with diglycidyl ethers or dibasic acid esters as taught by Crovatt, Jr. and by Fischer, to achieve higher melt viscosity does not ameliorate the brittleness of the structure.

Alkoxylated tetrols of the type disclosed by Weedon et al, and those chain extended as taught by Crescentini et al, are also waxes with the disadvantages inherent in such physical consistency. Further, an adverse effect has been observed in heavy denier polyamide fibers containing chain extended alkoxylated tetrols in comparison with the excellent crush resistance and recovery from crush of untreated polyamide fibers when tufted or woven into carpets and subjected to normal foot traffic in use as floor coverings.

Further, in structures such as those taught by Kowallik et al, the raw materials and reactions involved tend to provide a product which is economically questionable.

SUMMARY OF THE INVENTION

Chain extended random alkoxylated polyols having branched configurations are useful as internal antistatic additives for polymeric structures. A polyol having a branched configuration is alkoxylated with a mixture of ethylene oxide and propylene oxide and then chain extended to produce a high viscosity fluid additive which is compatible as a dispersed phase with polymer melts and does not agglomerate or separate from the melt during spinning. From about 0.1% to about 15% by weight of the additive is incorporated in polymeric structures as an antistatic agent.

DETAILED DESCRIPTION

The structures of this invention are useful as antistatic agents when included within synthetic high molecular weight fiber forming polycarbonamides of the general type characterized by the presence of recurring carbonamide groups as an integral part of the polymer chain, and wherein such groups are separated by at least two carbon atoms. They are further characterized by high melting points, pronounced crystallinity and insolubility in most solvents except mineral acids, formic acid and phenols.

The polyamides of this type are usually made by heating either (a) substantially equimolar proportions of the diamine and dicarboxylic acid or (b) various amino acids or amide forming derivatives thereof until the material has polymerized to the fiber forming stage. The diamines and the dicarboxylic acids and amide forming derivatives thereof which can be used as reactants to yield the fiber forming polyamides are well known in the art. Representative examples are ethylene diamine, propylene diamine, tetramethylene diamine, pentamethylene diamine, hexamethylene diamine, octamethylene diamine, and decamethylene diamine. Suitable dicarboxylic acid reactants may be illustrated by sebacic acid, octadecane dioic acid, adipic acid, suberic acid, azelaic acid, undecanedioic acid, butyric acid, palmitic acid, brassilic acid, and tetradecane dioic acid.

In the place of the above noted dicarboxylic acids and diamines the amide forming derivatives thereof can be employed to form fiber forming polymers. Amide forming derivatives of the diamines include the carbamates and N-formyl derivative. Amide forming derivatives of the dibasic carboxylic acids comprise the mono- and diester, the anhydride, the mono- and diamide, and the acid halide.

In addition to the above diamines and dicarboxylic acids and their derivatives, the polyamides in which the structure of the invention is useful may be prepared from certain of the amino acids. Representative of such amino acids are 6-amino caproic acid, 7-amino heptanoic acid, 8-amino octanoic acid, 9-amino nonanoic acid, 10-amino decanoic acid, 11-amino undecanoic acid, 12-amino dodecanoic acid, 13-amino tridecanoic acid, and 22-amino behenic acid. The lactams of these amide acids also may be used as monomers for the preparation of polyamide fibers in which the present invention is useful.

In addition to the homopolyamides, copolyamides and terpolyamides are also benefited by the structure of this invention. The copolyamides and terpolyamides are obtained in known manner. That is, mixtures of diamines and dibasic acids are used in forming the co- and terpolymers, with the diamine being present in substantially equimolar proportions to the total dibasic acids present during the polymer-forming reaction. The co- and terpolymeric products may be formed directly from the corresponding monomers, or one or more homopolymers may be added to the polymerizable reactants, distribution of the desired units entering the products via amide interchange. The conventional polyamide melt polymerization cycle is suitable.

Briefly described, the present invention contemplates alkoxylating a polyol with a mixture of ethylene oxide and propylene oxide under condensation reaction conditions to produce a random alkoxylated polyol having a branched configuration which is then chain extended. The resultant structure has superior properties as an antistatic additive to polyamide fibers.

This invention provides a fluid structure of high viscosity which is antistatic in effect when included as an additive in polyamide fibers.

The present invention provides a structure which is compatible as a dispersed phase with the polymer melt in that it does not agglomerate or separate from the melt during the fiber spinning operation, and it does not decompose under melt spinning conditions.

Further, this invention provides a structure whose fluid nature permits drawing, even at high draw ratios, without fracture of the dispersed rod-like particles in the polymeric fibrous structure.

The invention also provides a structure whose fluid nature when included as an additive in polymeric fibrous structures does not significantly alter the modulus or resilience of the fibers in use.

Further, this invention provides a structure whose water solubility can be readily adjusted during manufacture to provide selected water solubility, depending upon the end use requirements of the polymeric structure.

The advantages of the present invention are realized in the preparation and use of alkoxylated polyols which are chain extended. Representative of suitable polyols are glycerol, trimethylolpropane, trimethylolethane, sorbitol, pentaerythritol, dipentaerythritol, and tripentaerythritol. Other suitable polyols will be apparent to those skilled in the art; this invention should not be construed as limited to those polyols hereinbefore specifically mentioned. The polyol is reacted under condensation conditions with mixtures of ethylene oxide and propylene oxide, thereby providing a random or heteric addition of oxyethylene and oxypropylene groups to the polyol to a molecular weight of at least 1,500 and more preferably 6,000 to 12,000 or greater. Thus alkoxylated polyol is reacted to a sufficient extent to provide the desired physical properties in the final product with a difunctional organic reactant such as, for example, terephthalic acid, terephthalic acid dimethyl ester, isophthalic acid, isophthalic acid dimethyl ester, 5-amino isophthalic acid, 5-amino isophthalic acid dimethyl ester, 5-sulfoisophthalic acid, 5-sulfoisophthalic acid dimethyl ester and/or their sodium salts, amino terephthalic acid, amino terephthalic acid dimethyl ester, toluene diisocyanate, adipic acid, maleic acid, oxalic acid or their esters. The difunctional reactant may be aliphatic or aromatic in structure or both, as in bisphenol A diglycidyl ether. Manner of reaction will be illustrated in examples to follow.

It is clear that a variety of organic polyepoxy compounds can be used, as well as a variety of other difunctional organic structures, but it is preferred that the functional groups be terminal groups, aliphatic and substituted aliphatic compounds having adjacent carbon atoms of the functional group as adjacent intermediate carbon atoms of a linear chain may be used. It is to be expected that compounds having such internal functional groups will react rather more slowly than those compounds having terminal functional groups. Further, a mixture of two or more polyfunctional compounds may be used to produce the antistatic agents of this invention, or the base polyol may be reacted sequentially with polyfunctional compounds to result in agents of the present invention.

Use of structures of this invention is made by incorporating about 0.1% to about 15% by weight of the chain extended polyalkoxylated polyol into the polymeric material. More preferably, about 1% to about 8% by weight of the antistatic agent will be incorporated into the polyamide by inclusion during polymerization by charging with the monomer or monomers or by addition to the partially polymerized mass or by addition to the completely polymerized mass in the polymerization vessel. The antistatic agent may alternatively be added to the molten polymer at a point prior to the spinneret, as, for instance, at the extruder screw, where the screw is equipped with a mixing or melt blending section. Alternatively, the antistatic agent may be added from solvent solution to chips or flakes of the polymer, after which the polymer chips or flakes are tumbled to distribute uniformly the antistatic agent and thereafter dried by means known to the art. The treated polymer is spun to yarn by means well known to the art; e.g., by melting on a grid into a stirred pool from which molten polymer is withdrawn by a metering pump and extruded through a filter pack and spinneret, or by melting polymer chip or flake on an extruder screw and subsequently passing the melt to a metering pump thus through a filter pack and spinneret. Of course, the antistatic additive may be metered into a continuous polymerization system, where the additive has not been charged with the monomer or monomers, at a point prior to filament formation wherein agitation of the molten mass is sufficient to disperse the additive within the mass.

Incorporation of the structures of the present invention has little or no effect upon physical properties of filaments and yarns spun from the compounded polymer. In fact, it has been observed that the spinning operation may be aided by use of lower extrusion temperatures thereby resulting in energy savings appreciable in the long run, that the drawing of fibers containing the additive is aided in that higher draw ratios and higher draw rates are possible than those normally attainable in absence of the additive, that a higher percentage of A-quality yarn may be produced at a given draw ratio and rate, and that crimping of fibers containing the additive is made more uniform with concomitant beneficial effect in cover of fabrics made from such crimped or textured yarns.

For a fuller understanding of the nature and advantages of this invention, reference may be made to the following examples. These examples are given merely to illustrate the invention and are not to be construed in a limiting sense. All quantities, proportions and percentages are by weight and all references to temperature are °C.

EXAMPLE I

A. Preparation of Alkoxylate

To a clean, dry stainless steel pressure reactor fitted with an efficient agitator, an internal cooling coil, a reactant inlet port, a nitrogen sparge tube, and a vacuum source, was added 6.66 parts by weight of pentaerythritol tetrapropoxylate and 0.18 parts by weight of sodium methylate. While stirring the charge a nitrogen sparge is set, vacuum is applied and the reactor is heated to 130° C. Agitation was continued for one hour until available methanol was distilled off and moisture reduced to less than 0.1% whereupon the vacuum was released by increasing the nitrogen sparge and shutting off the vacuum source. When pressure in the reactor reached 5 psig, 9.17 parts by weight of ethylene oxide and 9.17 parts by weight of propylene oxide were added simultaneously below the surface of the initial charge while maintaining vigorous agitation and controlling reactor temperature at 108° to 112° C. Rate of oxides addition was consistent with rate of reaction and at pressures normally utilized in such reaction. When the oxides were reacted to maximum pressure drop, the reaction mass vacuum stripped under nitrogen sparge for two hours; hydroxyl value at that point was 150.

Following stripping, an additional 37.5 parts by weight of ethylene oxide and 37.5 parts by weight of propylene oxide were added to the reaction mass simultaneously and under the same conditions of reaction as described hereinbefore. After the final vacuum stripping and cooling to room temperature, the product was found to be a clear liquid of Gardner color 3, Brookfield viscosity of 1,000 cps, hydroxyl value of 38 and free alkali of 0.72.

B. Chain-extension of Alkoxylate

To a clean, dry, jacketed stainless steel reaction vessel equipped with an agitator of design suitable for effectively stirring liquids of high viscosity, a nitrogen sparge tube and a vacuum source, was charged 96.4 parts by weight of the alkoxylate prepared as described under (A) above. While stirring the charge, full vacuum is applied under a light nitrogen sparge, the vessel is heated to 110° C., and conditions are maintained for approximately two hours when moisture by analysis was found to be less than 0.1% at which point the vessel was cooled to 25° C. and the vacuum released with nitrogen to atmospheric pressure. 3.60 parts by weight of Bisphenol A diglycidyl ether was then gradually added under agitation to the dry alkoxylate and the vessel temperature raised to 95°–100° C. while maintaining a nitrogen atmosphere in the vessel. While agitation was continued, viscosity of the reaction mass was observed to increase to a Brookfield viscosity of 400,000 cps at 25° C. At this point, the reaction was quenched by reducing vessel temperature to 40°–45° C. and adding sufficient deionized water to produce a solution of 60% solids. The product was a flowable liquid of Gardner color 2, a Brookfield viscosity of 14,000 cps at 25° C., and a cloud point of 53° C.

EXAMPLE II

A. Preparation of Alkoxylate

To the reactor utilized in Example I, Part A, was charged 6.66 parts by weight pentaerythritol tetrapropoxylate and 0.36 parts by weight sodium methylate. Using the same procedure as in Example I, Part A, the charge was vacuum stripped after which 13.98 parts by weight of ethylene oxide and 79.22 parts by weight of propylene oxide were added simultaneously as previously done. Under the same procedure and conditions of reaction, the mixed oxides were condensed completely with the pentaerythritol tetrapropoxylate, yielding a product found to be a clear liquid of Gardner color 1, Brookfield viscosity 765 cps at 25° C., hydroxyl value of 45 and solubility in water of less than 1% at 25° C.

B. Chain-extension of Alkoxylate

To a clean, dry, jacketed stainless steel reaction vessel fitted with an overhead condenser designed for vacuum distillation and otherwise equipped as was the reaction vessel of Example I, Part B, was charged 92.85 parts by weight of the alkoxylate prepared under (A) above and 3.97 parts by weight of dimethyl terephthalate, after which the mass was heated to 100° C. under vigorous agitation while sparging with nitrogen. After the dimethyl terephthalate was completely dissolved, 0.15 parts by weight of tetrabutyl titanate catalyst was added to the reaction mass and agitation was continued for two hours and thirty minutes. Following the induction period after catalyst addition, vacuum was gradually applied until full vacuum was attained, heat in the reactor was increased to 160°–170° C. while maintaining vigorous agitation and light nitrogen sparge, and the methyl alcohol formed as reaction by-product was collected in the amount of 1.15 parts by weight. With cessation of methyl alcohol distillation, indicating completion of reaction, the reactor was cooled to 100° C., the vacuum was released with nitrogen to atmospheric pressure, and under nitrogen atmosphere sufficient 85% phosphoric acid was added to neutralize the total alkali present in the reaction mass. Agitation was continued until neutralization was complete, after which the reactor was cooled to 50° C. and the product removed. The product at room temperature was found to be a viscoelastic fluid of 175,000 cps Brookfield viscosity, pale yellow in color and insoluble in water.

EXAMPLE III

A. Preparation of Alkoxylate

The alkoxylated product of Example I, Part A, was prepared as described. Following the final vacuum stripping at the end of oxides addition, an additional eight moles of ethylene oxide was added to the product under the same conditions of condensation used in preparing the original alkoxylate. The resultant reaction product was a structure having a reduced content of terminal secondary hydroxyls.

B. Chain-extension of Alkoxylate

To the same reaction vessel used in Example II, Part B, was charged 1905.6 parts by weight of the ethylene oxide capped product of Part A, this Example. Agitation of the charge was started, full vacuum was applied under a light nitrogen sparge, the vessel was heated to 125° C., and conditions were maintained for one and one-half hours at which time vacuum was released with nitrogen and 100.8 parts by weight of the sodium salt of 5-sulfo isophthalic acid dimethyl ester was added to the charge. When dispersion of the isophthalate was complete, temperature of the vessel was raised to 180° C., held under vacuum and nitrogen sparge, and for two hours when heat was turned off and the reactor cooled to room temperature. After breaking vacuum, 0.8 parts by weight of tetrabutyl titanate catalyst was added to the reaction mass. Vacuum and nitrogen sparge were again applied, the vessel was heated to 220° C. and conditions were maintained for five hours. An additional 0.4 parts by weight of tetrabutyl titanate was added in the same manner as the first catalyst charge, reaction conditions were returned to those maintained after the first catalyst charge and held for five hours. A final 0.2 parts by weight of tetrabutyl titanate was then added as before, reaction conditions were again returned to those maintained after the first catalyst charge and held for an additional five hours after which collection of distillate was observed to have ceased. The vessel was cooled to 80° C., vacuum was relieved with nitrogen, and the reaction mass was removed. The product was found to be a clear yellow fluid having a Brookfield viscosity of 476,000 cps at 25° C., soluble in cold water but insoluble in hot water.

EXAMPLE IV

Commercially obtained polyamide chip was cut to flake in a laboratory Wiley mill, the flake was sieved to pass a 40-mesh screen and to be retained on a 60-mesh screen. Twenty-five grams of the then sized flake was placed in a 250 ml spherical glass flask fitted with a stainless steel mixing blade. To the flake in the flask while being mixed with the blade was added a sufficient quantity of the product of Example I, dissolved in isopropanol in the ratio of 1 part product to 5 parts by weight of alcohol, to provide 4 parts by weight of product to 96 parts by weight of flake. Mixing was continued for four minutes to distribute the product solution uniformly over the surfaces of the flake particles. Following the mixing period, the flask was placed in a vacuum oven at 80° C., and vacuum was applied to 2 mm mercury indication for one hour after which the vacuum was released and the flask returned to the mixing stand.

The flake containing the now dry product was remixed for a period of ten minutes after which the flask was again placed in a vacuum oven conditioned as before and held there for sixteen hours to ensure dryness of the polymer and the additive. At end of the drying period, vacuum was broken with nitrogen, the flake was transferred to a desiccator, thence to a steel mold comprised of a heavy shell containing bore fitted with a close-tolerance piston. The flake was compressed in the mold at a pressure of 20,000 psig, the piston was locked in place, and the mold heated to the melting point of the polymer whereupon the mold was quickly cooled and the compressed polymer slug removed to a desiccator.

Utilizing a bench-scale piston extruder under conditions well known to those skilled in the art, the polymer slug containing the additive was spun and drawn continuously to a 15 denier yarn having 3 filaments. Draw ratio used was 4×, and the yarn was taken up on two tubes. Yarn properties and appearance were found to be normal for a 15 denier textile yarn. Microscopic examination of the filaments showed them to consist of an external polymer phase containing an internal dispersed phase having the appearance of longitudinally disposed rod-like particles in overlapping relationship.

The two ends of drawn-yarn were combined to provide a 30 denier yarn having 6 filaments which was knit into a circular hose leg on a Carolina Lab Knitter, Model LK-100. The knit fabric was scoured at 40° C. for ten minutes in a bath comprised of 0.1% nonionic detergent and 0.1% trisodium phosphate in distilled water, both to fabric ratio 40:1, followed by four rinses in distilled water. The scoured fabric was subsequently dyed in a standard acid dyeing procedure using, for instance, Merpacyl Blue 2GA at 2% on weight of the fabric. Depth of shade attained a levelness of dyeing were excellent. After dyeing, the fabric was air-dried, pressed smooth, and die-cut into discs three inches in diameter for determination of resistivity.

Apparatus used in determining resistivity of the fabric consisted of a Keithly Model 6105 resistivity adapter, a Keithley Model 240A high voltage power supply, and a Keithley Model 610C electrometer. The procedure consisted of conditioning the fabric in the atmosphere of evaluation for a minimum of four hours, placing the fabric between the electrodes of the resistivity adapter, applying a voltage to the fabric, measuring the current passed through the fabric with the electrometer, and converting the measured current to resistivity. Rather than using the thickness of the fabric in the conversion, account was taken of variation in fabric density by utilizing the weight in grams of the fabric disc.

A control lot of polyamide polymer without additive, and the products of Examples II and III added to portions of the same lot of polyamide polymer, were processed into yarn in the same manner as was the product of Example I. The yarns were knit into fabric, scoured, dyed, dried, conditioned, and evaluated for resistivity in the same manner as described above. The results are tabulated below.

TABLE I

| Voltage Applied | 50V | 500V | 1200V |
|---|---|---|---|
| Product of Example I | $5.5 \times 10^{13}$ | $3.7 \times 10^{13}$ | $3.8 \times 10^{10}$ |
| Product of Example II | $7.9 \times 10^{12}$ | $1.7 \times 10^{12}$ | $9.7 \times 10^{9}$ |
| Product of Example III | $4.6 \times 10^{11}$ | $6.9 \times 10^{10}$ | $1.9 \times 10^{9}$ |
| Control without Additive | $2.2 \times 10^{14}$ | $1.9 \times 10^{14}$ | $1.1 \times 10^{14}$ |

All values were determined at 72° F. abd 25% RH.

Synthetic polymeric structures in filament form are generally recognized to have volume resistivities in the range of $10^{14}$ to $10^{15}$ ohms, whereas cotton fibers have resistivities in the order of $10^{12}$ ohms. Structures of this invention when included as an additive to synthetic polymeric structures produce resistivities at least as low as, and generally lower than, that obtaining with cotton fibers; this is exemplified in Table I. Whereas synthetic fibers in textile articles are known to generate high levels of electrostatic charge, and cotton fibers in textile articles are known not to because so charged, it is apparent that the structure of this invention are antistatic in effect.

While the invention has been described with reference to certain specific embodiments thereof, it is understood that it is not to be so limited since alterations and changes may be made therein which are within the full intended scope of the appended claims.

What is claimed is:

1. An internal antistatic additive composition for polymeric structures which is a branched configuration polyol first alkoxylated with a mixture of ethylene oxide and propylene oxide and then reacted with a difunctional reactant to produce a chain extended random alkoxylated polyol.

2. The composition of claim 1 wherein the molecular weight of the alkoxylated polyol is at least 1,500.

3. The composition of claim 1 wherein the polyol is pentaerythritol tetrapropoxylate and the difunctional reactant is Bisphenol A diglycidyl ether.

4. The composition of claim 1 wherein the polyol is pentaerythritol tetrapropoxylate and the difunctional reactant is dimethyl terephthalate.

5. The composition of claim 1 wherein the polyol is pentaerythritol tetrapropoxylate and the difunctional reactant is 5-sulfo isophthalic acid dimethyl ester.

6. A process of incorporating an effective amount of the composition of claim 1 into a polymeric structure sufficient to improve antistatic properties of the structure.

7. The process of claim 6 wherein about 0.1% to about 15% by weight of the composition is incorporated into the structure.

8. The product produced by the process of claim 6.

9. A polymeric structure containing an effective amount of the composition of claim 1 sufficient to improve antistatic properties of the structure.

10. The polymeric structure of claim 9 wherein there is present from about 0.1 to about 15% by weight of the composition.

11. The polymeric structure of claim 9 wherein the structure is a polyamide.

12. The polymeric structure of claim 9 wherein the structure is a polyester.

* * * * *